United States Patent [19]
Bodine

[11] 3,743,523
[45] July 3, 1973

[54] METHOD FOR THE SONIC TREATING OF FOOD MATERIAL

[76] Inventor: Albert G. Bodine, 7877 Woodley Avenue, Van Nuys, Calif. 91406

[22] Filed: Aug. 4, 1971

[21] Appl. No.: 169,059

Related U.S. Application Data
[62] Division of Ser. No. 11,137, Feb. 13, 1970, abandoned.

[52] U.S. Cl............ 99/217, 99/6, 99/156, 99/348, 99/1, 99/516, 259/DIG. 44
[51] Int. Cl.............................. A23l 3/30
[58] Field of Search............... 99/1, DIG. 5, 217, 99/348, 156, 159, 6, 516, 535, 536; 259/DIG. 44, 72, DIG. 42, 1

[56] References Cited
UNITED STATES PATENTS
| | | |
|---|---|---|
| 2,881,080 | 4/1959 | Simjian........................... 99/217 |
| 2,980,537 | 4/1961 | Hagen............................ 99/217 X |
| 3,410,765 | 11/1968 | Bodine........................... 259/1 R X |
| 2,713,998 | 7/1955 | Eicken........................... 99/217 UX |
| 1,318,740 | 10/1919 | Fessenden...................... 99/217 |
| 3,410,532 | 11/1968 | Bodine........................... 259/1 R X |
| 3,618,587 | 11/1971 | Lee, Sr. .......................... 99/1 X |
| 2,886,439 | 5/1959 | Eytinge.......................... 99/217 X |
| 2,585,103 | 2/1952 | Fitzgerald....................... 99/217 X |
| 2,138,051 | 11/1938 | Williams......................... 99/217 X |
| 2,417,722 | 3/1947 | Wolff............................. 99/217 X |

FOREIGN PATENTS OR APPLICATIONS
862,489  1/1953  Germany....................... 99/DIG. 5

OTHER PUBLICATIONS
Food Tech. Feb. 1959 pp. 109

Primary Examiner—Frank W. Lutter
Assistant Examiner—Steven L. Weinstein
Attorney—Sokolski & Wohlgemuth

[57] ABSTRACT

High level sonic energy is utilized to generate elastic pressure pulses in a liquid in which food material is immersed. The sonic energy causes the material to be efficiently worked with the liquid, thus facilitating processes requiring liquid working such as cooking and soaking.

1 Claim, 1 Drawing Figure

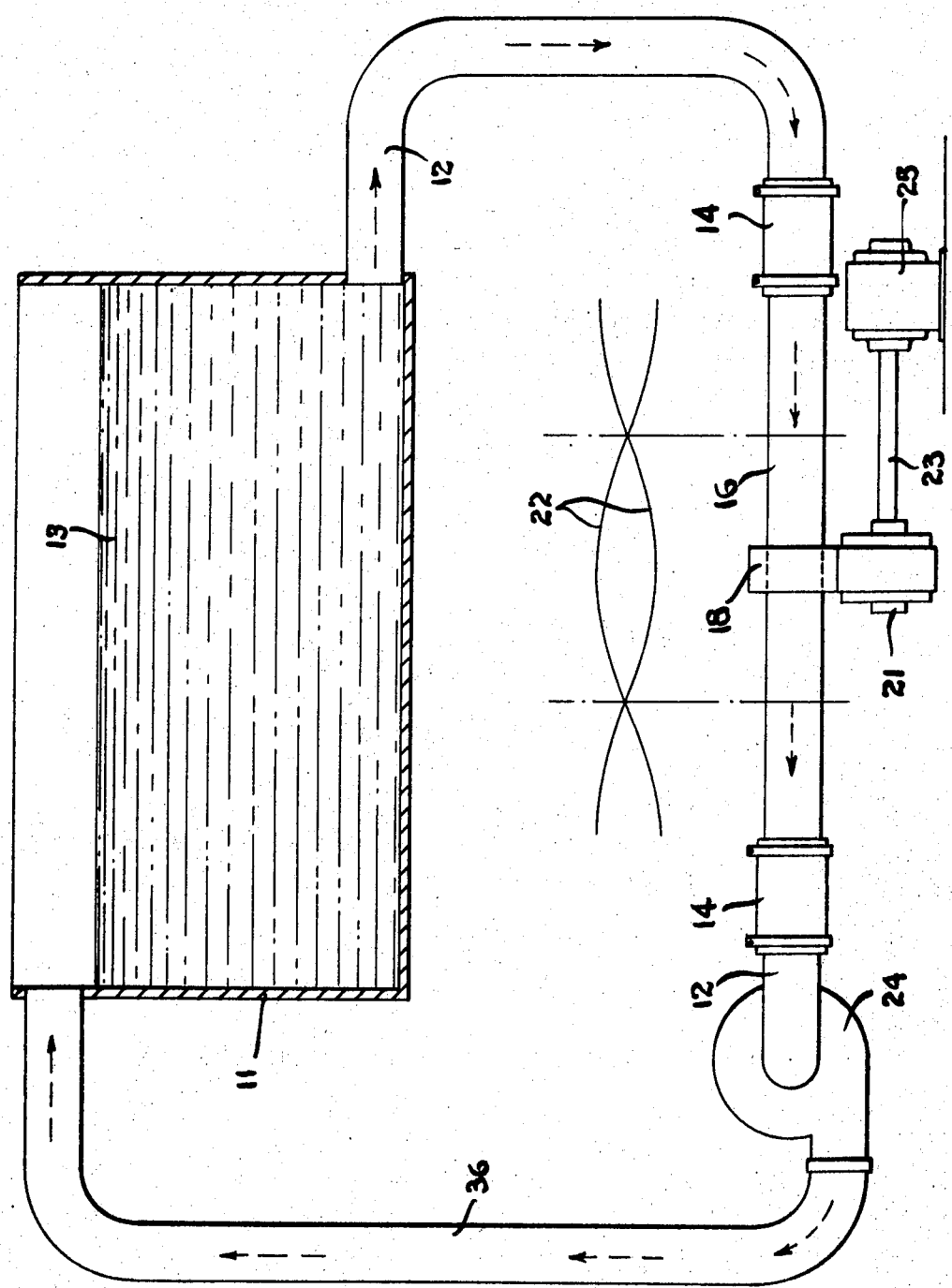

METHOD FOR THE SONIC TREATING OF FOOD MATERIAL

This application is a division of my application Ser. No. 11,137, filed Feb. 13, 1970, now abandoned.

This invention relates to techniques and devices for food processing and more particularly to such techniques and devices in which the saturation of food material with a liquid is facilitated by transmitting sonic energy to a contained liquid in which the food material is immersed.

One of the necessary functions in the cooking of food is causing water to penetrate the solid particles. Penetration is required whether the food is cooked with a heating process or simply prepared by soaking, such as the soaking of cucumbers for making pickles. Using conventional cooking techniques, some food materials must be soaked for extended periods of time, at the end of which the food particles may be become excessively soft or even damaged. The separation of meat from bone, if accomplished by heating, may leave the meat excessively soft, and does not necessarily remove all the meat from the bone. Some foods like, for example, beans may be dry stored for considerable periods of time before cooking. If the beans become excessively dry as a result of extended storage they may become too fragile for the rigors of heating, and will therefore be damaged during a normal cooking process.

The method and apparatus of this invention overcome the aforementioned shortcomings by providing means for causing the saturation of food particles using sonic energy. By maintaining an elastic pressure cycle of sufficiently high amplitude an intimate contact may be maintained between the liquid and the surface of the solid food particles, thereby providing improved liquid penetration and a higher coeficient of heat transfer. The result of these improvements is a faster process of hydration and cooking, with the further result that the food particles will not be excessively softened by extended soaking and cooking. Where it is desired to penetrate foods in order to raise the moisture content or to add other food value, typically the addition of molasses to cattle feed, it is found that the rate of penetration of the liquid is largely affected by internal capillary action. The elastic pressure pulses generated by means of this invention cause the liquid to penetrate the outer layers of the food particles, but further penetration becomes dominated by capillary forces. If the sonic action is continued after the outer layer has become saturated, there is a risk of damaging or softening the outer layer. Means are therefore provided for applying the sonic energy intermittently so that static soaking times are permitted between successive sonic applications. Means are also provided in certain embodiments of the invention to vary the sonic energy level to suit the particular type of food particle being processed. If it is desired to add moisture to the food, such as, for example, in the soaking of cucumbers for making pickles, in the hydration of beans, or the addition of molasses to cattle feed, it is necessary to maintain the level of sonic energy below that required to produce cavitation in the liquid. In the separation of meat from bone or the detachment of starches and proteins from basic food stock, it is necessary to maintain the sonic energy at a level sufficient to cause very light cavitation. A light cavitation will cause complete separation without causing erosion of the bone. In other applications a high level of cavitation may be required, for example to cause homogenization of food products for the breaking down of fats, or to emulsify oils. High cavitation will also cause sterilization, and is effective to stop enzyme action in processes such as the preparation of orange juice, avoiding the need for the addition of chemicals which might affect the flavor.

It is therefore the principal object of this invention to provide an improved technique and apparatus for facilitating the liquid saturation of food materials. Other objects of this invention will become apparent from the following description taken in connection with the accompanying drawings of which:

The FIGURE is a schematic drawing illustrating one embodiment of the invention.

It has been found most helpful in analyzing the device and method of this invention to analogize the acoustically vibrating circuit utilized to an equivalent electrical circuit. This sort of approach to analysis is well known to those skilled in the art and is described, for example, in Chapter 2, of "Sonics" by Hueter and Bolt, published in 1955 by John Wiley and Sons. In making such an analogy, force F is equated with electrical voltage E, velocity of vibration $u$ is equated with electrical current $i$, mechanical compliance $C_m$ is equated with electrical capacitance $C_e$, mass M is equated with electrical inductance L, mechanical resistance (friction) $R_m$ is equated with electrical resistance R and mechanical impedance $Z_m$ is equated with electrical impedance $Z_e$.

Thus, it can be shown that if a member is elastically vibrated by means of an acoustical sinusoidal force $F_o \sin\omega t$ ($\omega$ being equal to $2\pi$ times the frequency of vibration), that $$Z_m = R_m + j[\omega M - 1/\omega C_m] = (F_o \sin\omega t/u) \quad (1)$$

Where $\omega M$ is equal to $(1/\omega C_m)$, a resonant condition exists, and the effective mechanical impedance $Z_m$ is equal to the mechanical resistance $R_m$, the reactive impedance components of $\omega M$ and $(1/\omega C_m)$ cancelling each other out. Under such a resonant condition, velocity of vibration $u$ is at a maximum, power factor is unity, and energy is more efficiently delivered to a load to which the resonant system may be coupled.

It is important to note the significance of the attainment of high acoustical Q in the resonant system being driven, to increase the efficiency of the vibration thereof and to provide a maximum amount of power. As for an equivalent electrical circuit, the Q of an acoustically vibrating circuit is defined as the sharpness of resonance thereof and is indicative of the ratio of the energy stored in each vibration cycle to the energy used in each such cycle. Q is mathematically equated to the ratio between $\omega M$ and $R_m$. Thus, the effective Q of the vibrating circuit can be maximized to make for highly efficient, high-amplitude vibration by minimizing the effect of friction in the circuit and/or maximizing the effect of mass in such circuit.

In considering the significance of the parameters described in connection with equation 1, it should be kept in mind that the total effective resistance, mass, and compliance in the acoustically vibrating circuit are represented in the equation and that these parameters may be distributed throughout the system rather than being lumped in any one component or portion thereof.

It is also to be noted that orbiting-mass oscillators are utilized in the implementation of the invention that automatically adjust their output frequency and phase to maintain resonance with changes in the characteristics of the load. Thus, in the face of changes in the effective mass and compliance presented by the load with changes in the conditions of the work material as it is sonically excited, the system automatically is maintained in optimum resonant operation by virtue of the "lock-in" characteristic of applicant's unique orbiting-mass oscillators. Furthermore in this connection the orbiting-mass oscillator automatically changes not only its frequency but its phase angle and therefore its power factor with changes in the resistive impedance load, to assure optimum efficiency of operation at all times. The vibrational output from such orbiting-mass oscillators also tends to be constrained by the resonator to be generated along a controlled pre-determined coherent path to provide maximum output along a desired axis.

Briefly described, this invention comprises a method and apparatus for sonic preparation of food particles. The food material to be processed is immersed into a vessel containing water or other liquid with which it is desired to work or saturate the food material, and sonic energy is delivered to the liquid by means of an orbiting mass oscillator which may be coupled to the liquid by suitable means such as a resonant tube or resonant bar. Means are provided to subject the food particles to alternate cycles of elastic resonant vibration and nonvibratory soaking. During the vibratory phase, sonic energy is transmitted through the liquid to the food particles causing the liquid to rapidly work and saturate the outer layers of the food particles. Once the outer layers have been saturated to an equilibrium condition, the food particles are permitted to soak in a nonvibratory liquid environment so that the inner layers of the food particle will accept moisture by capillary action. Means are further provided to vary the level of sonic energy, the duration of its application, and the ratio of vibratory to nonvibratory soak times.

Referring now to FIG. 1 a schematic drawing illustrating the general features of a first embodiment of the invention is shown. Vat 11 is open at its top and is partially filled with liquid 13 which may be water or any other liquid with which it is desired to saturate the food particles. The food material is introduced into the open top of vat 11 from a hopper (not shown) or other appropriate means. Disposed near the bottom of vat 11 is a drain pipe 12 through which the liquid and food material may flow to resonant tube 16 which is disposed between two sections of pipe 12, being connected thereto by means of compliant hose sections 14. Downstream of resonant tube 16, there is installed at the end of pipe 12 a pump 24, the outlet of which is connected to return line 36 through which the food particles and liquid are returned to vat 11 by virtue of the pumping action of the pump.

The housing 18 of an orbiting mass oscillator 21 is attached to resonant tube 16 substantially at the center of its length. The orbiting mass oscillator may be of the type, for example, shown in my Pat. No. 3,402,612 and is driven by means of flexible shaft 23 which is connected to a motor 25. The orbiting mass oscillator is preferably driven at a frequency such as to cause resonant elastic vibration of the vibration system including the resonant tube 16 and the liquid and material therein so as to set up standing wave vibration of the tube as indicated by graph lines 22. This embodiment of the invention is suitable for saturating pickles, beans, animal feed, and the like. It is to be noted that in such processes it is often desirable to maintain the sonic energy at a level slightly below cavitation in order to avoid damaging the food particles.

In the operation of this embodiment, liquid 13 and food material are placed into vat 11 and allowed to flow through pipe 12 to fill the pipe, resonant tube 16, connecting hoses 14, pump 24, and most of return pipe 36. Pump 24 is then started, thereby causing the liquid and food material immersed therein to circulate through the system. Motor 25 is then started and operated at a speed such as to drive the orbiting mass oscillator at a frequency which will cause resonant elastic vibration of the resonant tube 16 and material contained therein.

As the food material flows through tube 16, it is subjected to sonic elastic pressure pulses transmitted through the liquid, which pulses cause the liquid to be driven into the surface of the food particles. The speed at which pump 24 is driven may be regulated to provide a flow rate which will allow the food particles to be subjected to vibration for a time sufficient to cause saturation of the outer layer thereof, the water containing the food then being pumped back to vat 11. The size of the vat or the level to which the liquid therein is filled, may be chosen so as to allow sufficient time for the saturated outer layers of the food particles to deliver moisture by capillary action to the inner structure. After an appropriate soaking, the food material is again drawn out of vat 11 through pipe 12 for a second vibratory phase to re-saturate the outer layers. The number of processing cycles and the amplitude of vibration may be varied to suit the particular food being processed.

The techniques and devices of this invention thus provide means for more effectively working or saturating food materials with liquids. Because the saturation is accomplished by sonic rather than thermal means, the process is accomplished faster and with less risk of damage to the food particles. Further, such technique provides penetration to the inner structure of the food particles without softening the outer layers.

I Claim:

1. A method for the sonic treating of food material with a liquid comprising the steps of:
immersing the food material to be treated in a container containing said liquid, circulating said liquid and said food material immersed therein through a closed system comprising said container, an outlet pipe leading away from said container and an inlet pipe leading into the container, the outlet and inlet pipes being connected by a resonant tube,
generating sonic energy by means of an orbiting mass oscillator, and
applying said sonic energy to the liquid it flows through the resonant tube by coupling the output of said oscillator to said tube thereby causing the vibration system comprising the liquid in the resonant tube and the material immersed therein to be vibrated elastically, said oscillator being driven at a frequency such as to cause resonant vibration of said system, said resonance being maintained with changes in the impedance characteristics of the food material, whereby the liquid is caused to be driven into the surface of the food material,
maintaining said liquid circulation through the closed system, while also maintaining the application of sonic energy to the liquid as it flows through the resonant tube, such that the food material is subjected to alternate predetermined periods of elastic resonant vibration for a time sufficient to cause saturation of the outer layers and of non-vibratory soaking for a time sufficient to allow inner layers of the food material to receive the liquid by capillary action, and until the food material is saturated throughout.

* * * * *